United States Patent
Kemmer et al.

(10) Patent No.: US 9,470,141 B2
(45) Date of Patent: Oct. 18, 2016

(54) METHOD FOR REGULATING A BOOST PRESSURE OF AN ENGINE

(71) Applicant: Robert Bosch GmbH, Stuttgart (DE)

(72) Inventors: Helerson Kemmer, Vaihingen (DE); Thomas Steidten, Ludwigsburg (DE); Jens Intorp, Stuttgart (DE); Daniel Zirkel, Wiernsheim-Serres (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/133,231

(22) Filed: Dec. 18, 2013

(65) Prior Publication Data

US 2014/0174079 A1    Jun. 26, 2014

(30) Foreign Application Priority Data

Dec. 20, 2012   (DE) .................. 10 2012 224 055

(51) Int. Cl.

| | |
|---|---|
| F02B 37/12 | (2006.01) |
| F01N 3/02 | (2006.01) |
| B60K 17/10 | (2006.01) |
| F02D 41/00 | (2006.01) |
| H01M 8/04 | (2016.01) |
| F02D 41/18 | (2006.01) |

(52) U.S. Cl.
CPC .......... *F02B 37/12* (2013.01); *F02D 41/0007* (2013.01); *H01M 8/04111* (2013.01); *F02B 2037/125* (2013.01); *F02D 41/18* (2013.01); *F02D 2200/0406* (2013.01); *F02D 2200/101* (2013.01); *H01M 2250/20* (2013.01); *H01M 2250/407* (2013.01); *Y02T 10/144* (2013.01)

(58) Field of Classification Search
CPC .... F02B 37/12; Y02E 60/50; F02D 41/0007; F02D 2200/0406; B60K 17/10; Y02T 10/144; F02M 25/0707
USPC .............. 60/605.1, 605.2, 602; 701/102
See application file for complete search history.

(56) References Cited

U.S. PATENT DOCUMENTS

| | | | |
|---|---|---|---|
| 2006/0021344 A1* | 2/2006 | Barba et al. .................. | 60/599 |
| 2010/0100300 A1* | 4/2010 | Brooks et al. ............... | 701/102 |
| 2012/0055152 A1* | 3/2012 | Petrovic ........................ | 60/602 |
| 2013/0098032 A1* | 4/2013 | Wade et al. .................. | 60/602 |

FOREIGN PATENT DOCUMENTS

DE      60 222 525      6/2008

* cited by examiner

*Primary Examiner* — Audrey K Bradley
*Assistant Examiner* — Dapinder Singh
(74) *Attorney, Agent, or Firm* — Norton Rose Fulbright US LLP

(57) ABSTRACT

In a method for regulating a boost pressure of an engine which has a compressor, an actual boost pressure and a setpoint boost pressure are used as input parameters. The setpoint boost pressure is regulated in such a way that a pressure ratio in the compressor does not exceed a limit pressure ratio. A reference boost pressure is ascertained based on a speed of the engine and a load of the engine. A flow and/or a pressure of air supplied to the engine is/are detected and an associated flow signal and/or pressure signal is generated. The smaller of the reference boost pressure and a limit boost pressure is used as a setpoint boost pressure. The limit boost pressure is ascertained based on a limit boost pressure ratio and a speed of the compressor.

12 Claims, 2 Drawing Sheets

METHOD FOR REGULATING A BOOST PRESSURE OF AN ENGINE

BACKGROUND OF THE INVENTION

1. Field of the Invention

The present invention relates to a method for regulating a boost pressure of an internal combustion engine.

2. Description of the Related Art

In engines and in particular internal combustion engines, such as gasoline and diesel piston engines, the air charge in a combustion chamber of the engine is increased by the use of a compressor, such as an exhaust gas turbocharger, for increasing the performance. The pressure with which the air is compressed into the combustion chamber of the engine is also denoted as boost pressure and is generally measured by a pressure sensor in the vicinity of the combustion chamber. The pressure signal is fed to a closed loop system, which controls the exhaust gas turbocharger, thus setting a desired boost pressure.

Exhaust gas turbochargers, in particular, have a pronounced time constant, and thus react comparatively sluggishly to changed control signals, making it difficult to regulate the boost pressure. It is therefore advantageous if a direct state variable of the exhaust gas turbocharger to be regulated is determined. Particularly suitable for this purpose is the speed of the compressor of the exhaust gas turbocharger. Knowledge of the compressor speed is of particular interest, since during operation of the turbocharger, a certain maximum speed threshold may not be exceeded, since otherwise the turbocharger may be damaged due to exceeding critical stresses in the compressor wheel or a deformation of the compressor wheel, which results in the rotor scraping the housing.

The compressor speed is in principle calculable with the aid of a known compressor characteristics map, provided that certain variables such as, for example, the pressure upstream and downstream from the compressor, the air mass flow rate through the compressor and the temperature upstream from the compressor, are known. Based on these variables, the position of an operating point in the compressor characteristics map and thus the speed of the compressor are known, without a need for a sensor to be used for the speed determination.

In combustion engines, the maximum torque should be made available to the driver as early as possible. Accordingly, high boost pressures are required, in particular at low compressor speeds. However, high compressor speeds may result in the so-called compressor surge. The so-called compressor surge is a phenomenon which occurs inherently in turbomachines, when, at a given speed, the applied pressure ratio is too high. In this case, flow separations occur, which stimulate the compressor blades to vibrate, which in turn results in the destruction of the turbomachine. Operation in or above the surge limit must therefore be avoided in any case.

In the vehicle, the surge range is avoided by regulating the boost pressure. In combustion engines, compressor surge is, for example, avoided by the use of wastegate valves which divert a portion of the exhaust gas past the turbine, thus limiting the speed of the exhaust gas turbocharger, and accordingly limiting the compressor pressure. If exceeding the surge limit is to be avoided via a characteristic curve to which input data has already been provided, a safety margin must be maintained to avoid surge under all operating conditions, for example, operation at high altitude with reduced ambient pressure, interference in the flow by intake of impurities, clogged air filters, unfavorable operating points and the like, and under consideration of possible series deviation. This limits the operating range of the compressor.

The above-described surge detection from measured pressure fluctuations is an indirect detection of the surge phenomenon. Inversion of the air mass flow rate lowers the pressure in the volume. The intensity and speed of this reduction depends on the corresponding system and the placement of the pressure sensor and must therefore be reexamined and provided with new input data for each configuration. This again results in a non-negligible safety margin to the surge limit and additional data input complexity.

On the other hand, operation of the compressor close to the surge limit may be of interest, depending on the application. In combustion engines, as described above, the maximum torque should be made available to the driver as early as possible. Turbo compressors for fuel cell applications, however, have their maximum efficiency close to the surge limit, so that optimum fuel consumption may be achieved only when operating near the surge limit.

Published German patent application document DE 602 22 525 T2, for example, describes a method for controlling the boost pressure of a supercharged internal combustion engine, in which the surge limit is entered into a characteristics map, and a pressure ratio may be determined based on a parameter representative of the air flow rate through the compressor, and in this way it may be determined whether the surge limit is exceeded.

Despite the numerous advantages of the methods known from the related art for regulating a boost pressure of an engine, they therefore still have a potential for improvement.

Thus, in the last-mentioned related art, the preparation of the characteristics map for surge limit detection for compressors is complex, since it must be prepared by detecting the pressure and air mass flow rate value and comparing it against a surge characteristic detected in surge test benches using high-resolution pressure sensors. Alternatively, surge during operation is identified from measured pressure fluctuations.

BRIEF SUMMARY OF THE INVENTION

For that reason, the present invention provides a method for regulating a boost pressure of an engine, in particular an internal combustion engine, as well as an engine having a regulation device for carrying out the method, which at least largely avoids the disadvantages of known methods and strategies for determining compressor surge and may be used in particular for avoiding or at least significantly reducing the above-mentioned safety margin to the surge limit of the compressor. The object of the present invention is to enable a direct detection of compressor surge using a simple, vehicle-compatible air mass flow rate sensor and/or pressure sensor, making it possible to substantially improve the boost pressure regulation for the purpose of avoiding compressor surge.

In the method according to the present invention for regulating a boost pressure of an engine, in particular an internal combustion engine, the engine having a compressor, in particular a turbocharger, the regulation uses an actual boost pressure and a setpoint boost pressure as input parameters, the setpoint boost pressure being regulated in such a way that a pressure ratio in the compressor does not exceed a limit pressure ratio, a reference boost pressure being ascertained based on a speed of the engine and a load of the engine, a flow and/or a pressure of air supplied to the engine being detected and an associated flow signal and/or pressure signal being generated, the smaller of the reference boost pressure and a limit boost pressure being used as a setpoint boost pressure, a limit boost pressure ratio based on a magnitude of a change over time of the flow signal and/or the pressure signal being ascertained, the limit boost pressure being ascertained based on the limit boost pressure ratio and a speed of the compressor.

The limit boost pressure ratio may be ascertained as exceeding a magnitude of the change over time of the flow signal and/or the pressure signal. The change over time of the flow signal may be ascertained as a change of the flow signal per unit of time. The limit boost pressure may be ascertained in such a way that the speed of the compressor is reduced corresponding to the change over time of the flow signal and/or the pressure signal. The speed of the compressor may be reduced by opening a bypass valve of the compressor. The pressure may be detected upstream and/or downstream from the compressor. The flow signal may be corrected with respect to a reference pressure and a reference temperature. The limit boost pressure ratio may be additionally ascertained from a zero crossing of the flow signal.

An engine according to the present invention may include a compressor, in particular a turbocharger, and a regulation device, the regulation device being designed for carrying out a method according to the present invention.

The engine may, in particular, include at least one fuel cell. Alternatively or additionally, the engine may, however, also include one or multiple other types of energy converters for converting one form of energy into another form of energy, for example, for converting chemical energy of a fuel into mechanical or electrical energy.

Within the context of the present invention, an engine is a machine that converts the chemical energy of a fuel into mechanical or electrical energy by a combustion process. Therefore, within the context of the present invention, an engine includes, in particular, heat engines such as internal combustion engines, combustion engines and fuel cell systems.

Within the context of the present invention, a heat engine is a machine that converts thermal energy, or simply heat, into mechanical energy.

Within the context of the present invention, a combustion engine is a heat engine that converts the chemical energy of a fuel into mechanical work by combustion. The combustion takes place in a combustion chamber in which a mixture of fuel and ambient air is ignited. The thermal expansion of the gas heated by combustion is used to move a piston. The piston is connected to a shaft which is driven to rotate by the movement of the piston. Common examples of combustion engines are the gasoline engine and the diesel engine in automobiles.

Within the context of the present invention, a fuel cell is a galvanic cell that converts the chemical reaction energy of a fuel supplied via a fuel supply line and an oxidant into electrical energy. The fuel may be hydrogen or methane or methanol. The oxidant is usually air or oxygen. Accordingly, steam or water vapor and carbon dioxide develop as exhaust gas.

Within the context of the present invention, a pressure ratio of a compressor is the quotient of the compressor outlet pressure to the compressor inlet pressure, i.e., the pressure of the air flowing from the compressor in the direction of the combustion chamber in proportion to the pressure of the air flowing into the compressor.

Within the context of the present invention, a limit pressure ratio is a pressure ratio above which damage may occur to the compressor due to surge. The limit pressure ratio may be defined in such a way that it corresponds exactly to the surge limit, i.e., a limit above which surge will occur in the compressor, as well as having a safety margin to the surge limit.

Within the context of the present invention, a flow signal is a signal which indicates any physical and/or chemically measurable property of a flow of air supplied to a combustion chamber of an engine and qualifies or quantifies it. In particular, it may be a flow rate and/or a mass flow rate and/or a volume flow of the air. In other words, the flow signal is at least one signal selected from the group made up of a mass flow rate signal, a volume flow signal and a flow rate signal. A mass flow rate is usually expressed in kilograms per hour, and indicates an air mass which flows through a measuring cross-sectional area in a certain time. A volume flow is usually expressed in cubic meters per hour. A volume flow is a volume of air which flows through a measuring cross-sectional area in a certain time. The flow rate is usually expressed in meters per second. In particular, the detected flow properties converted into a signal relate to fluctuating flow properties, i.e., flow properties varying over time.

Within the context of the present invention, a change of the flow signal and/or the pressure signal over time is the absolute amount of change of the flow signal and/or the pressure signal in a certain period of time, and the gradient of the signal, i.e., the derivation of the signal with respect to time.

Within the context of the present invention, a reference pressure is an air pressure in relation to sea level. The reference pressure generally amounts to about 1 bar.

Within the context of the present invention, a reference temperature is an ambient temperature of the engine. This reference temperature generally amounts to about 20° C.

Within the context of the present invention, the surge of the compressor, also briefly referred to as compressor surge, is a potentially dangerous operating condition for the structural integrity of the compressor. In a compressor, the pressure of the inflowing working medium, which in the field of the present invention may be air, is increased step-wise with the aid of multiple compressor stages. It may now occur that the flow breaks up on the blades of a compressor, resulting in turbulences. This causes the compressor performance to be reduced. In case the pressure that has built up downstream from the compressor exceeds the pressure generated by the compressor, the effect occurs that the flow of air is reversed. During this return flow, the pressure drops downstream from the compressor outlet; the flow reverses again and again flows from the compressor outlet in the actual direction. This interaction is called surge, which results in significant cyclic loads of the compressor and may result in its destruction. Measures for reducing this behavior are referred to as surge protection.

According to the present invention, it is proposed to detect compressor surge using the already present vehicle-compatible mass air flow sensor or pressure sensor. This makes it possible to reduce the safety margin to the surge limit and the application-specific data input complexity. This also makes the surge detection more robust and less sensitive with respect to sensor placement. The boost pressure regulation may be significantly improved with respect to avoiding compressor surge. The advantage is better utilization of the operating range of the compressor, without the risk of damage to the same. In the method according to the present invention, the following sensors and positions may be used in principle for detecting compressor surge: an air mass flow rate sensor at the inlet of the compressor, a pressure sensor downstream from the compressor and a pressure sensor upstream from the compressor.

DETAILED DESCRIPTION OF THE INVENTION

Figure 1:
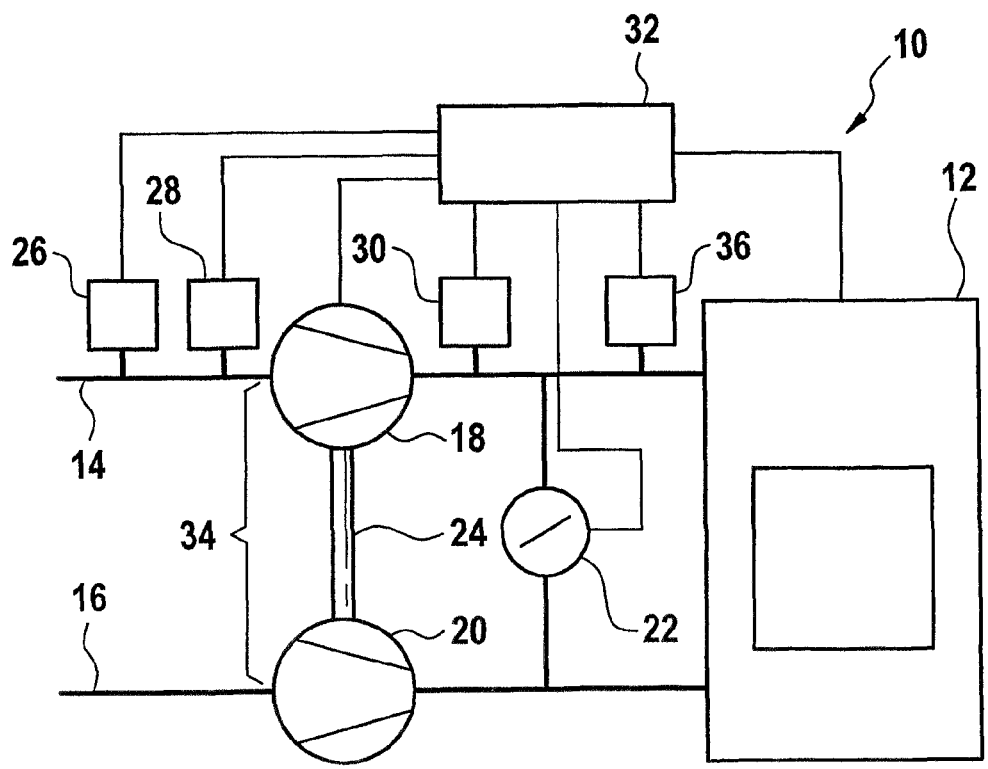
FIG. 1 shows a schematic representation of a configuration of a fuel cell system.

FIG. 1 shows an engine 10 according to the present invention in the form of a fuel cell system. The fuel cell system includes a fuel cell 12, an air supply line 14, an exhaust gas line 16, a compressor 18, an exhaust gas turbine 20, a bypass valve 22 and a supply line, which is not shown in greater detail, for fuel to fuel cell 12. Bypass valve 22 may be, for example, a control butterfly valve. For example, a wastegate valve may be used as bypass valve 22. Fuel cell 12 is a galvanic cell, which converts the chemical reaction energy of a fuel supplied via the fuel supply line, which is not shown, and an oxidant, which in the specific embodiment shown here is intake air supplied via air supply line 14 of fuel cell 12, into electrical energy. The fuel may be hydrogen or methane or methanol. Accordingly, steam or water vapor and carbon dioxide develop as exhaust gas.

Compressor 18 is situated in air supply line 14. Exhaust gas turbine 20 is situated in exhaust gas line 16. Compressor 18 and exhaust gas turbine 20 are mechanically connected via a shaft 24. Shaft 24 may be additionally driven electrically. An air mass flow rate sensor 26 and/or a pressure sensor 28 may also be situated upstream from compressor 18 and/or a pressure sensor 30 may be situated downstream from compressor 18 in air supply line 14. Compressor 18, shaft 24 and the exhaust gas turbine together form a turbocharger, and in the case of this exemplary embodiment, they form an exhaust gas turbocharger 34. Furthermore, engine 10 includes a regulation device 32. Regulation device 32 is designed for carrying out a method as described below according to the present invention for regulating a boost pressure of engine 10.

In the method according to the present invention for regulating a boost pressure of engine 10, the regulation carried out by regulation device 32 uses as an input parameter an actual boost pressure, which is, for example, detected by an additional pressure sensor 36 in air supply line 14 immediately upstream from fuel cell 12 or by pressure sensor 30, and a setpoint boost pressure. The setpoint boost pressure is regulated in such a way that a pressure ratio in compressor 18 does not exceed a limit pressure ratio. At the beginning of the method according to the present invention for regulating a boost pressure of engine 10, a setpoint speed of compressor 18 is ascertained based on a speed of the engine, which is, for example, the speed of an electric motor driven by fuel cell 12, and a load of engine 10. The setpoint speed of compressor 18 may be ascertained with the aid of a reference characteristics map. The reference characteristics map may be, for example, stored in regulation device 32. The reference characteristics map includes the necessary boost pressure values for the present speed of engine 10 and the load for a reference pressure value $P_{REF}$ and a reference temperature value $T_{REF}$, for example, 1 bar and 20° C. Air mass flow rate sensor 26 detects an air mass flow rate W.

Figure 2:
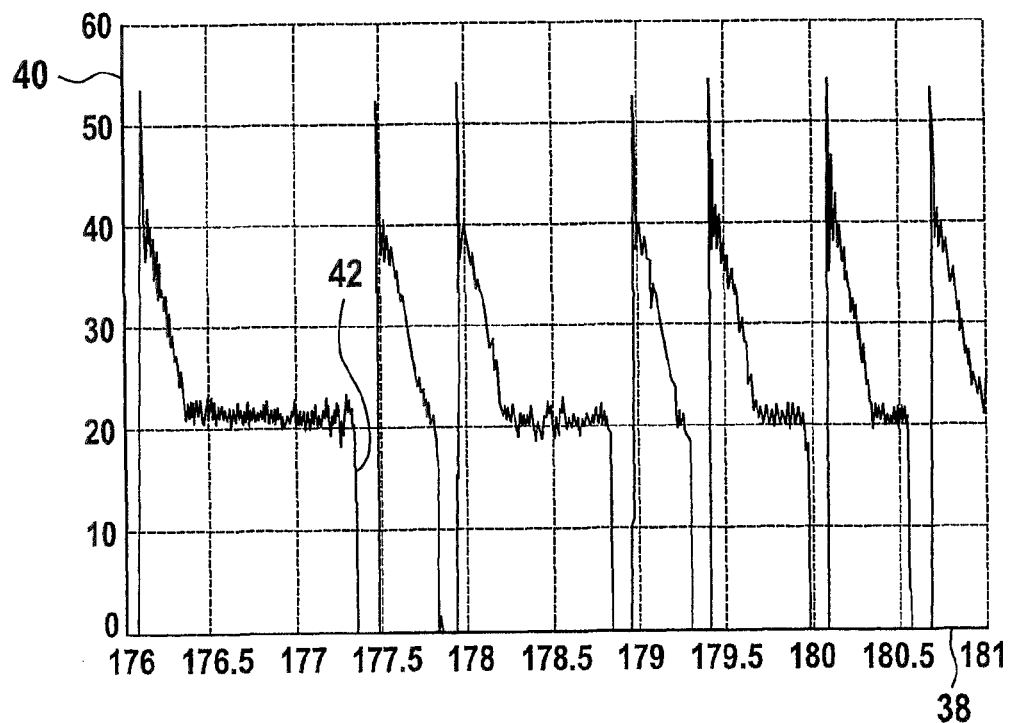
FIG. 2 shows a schematic representation of a mass flow rate during compressor surge.

FIG. 2 shows a flow signal detected by air mass flow rate sensor 26. The time in seconds is plotted on X-axis 38, and a corrected air mass flow rate W* in g/s is plotted on y-axis 40 in FIG. 2. Air mass flow rate W may be corrected with respect to reference temperature $T_{REF}$ and reference pressure $P_{REF}$, in particular according to the following formula:

$$W* = W \frac{P_{REF}}{P_{IN}} \sqrt{\frac{T_{IN}}{T_{REF}}}$$

Parameters $T_{IN}$ and $P_{IN}$ represent the pressure and the temperature of the air at the inlet of compressor 18. As mentioned above, reference temperature $T_{REF}$ lies in the range of the usual ambient temperature and reference pressure $P_{REF}$ is an air pressure in relation to sea level. In the diagram of FIG. 2, corrected air mass flow rate W* is given in g/s.

As a result, regulation device 32 ascertains a limit boost pressure ratio based on the flow signal and its change over time. A limit boost pressure ratio is seen, for example, as a surge in the flow signal. During operation of compressor 18 in surge, the flow signal drops instantaneously due to the change in direction of the intake air, as is apparent, for example, in the position marked in FIG. 2 as 42. Surge and accordingly the limit boost pressure ratio may then be inferred from exceeding a predefined magnitude of the change over time of the flow signal. In other words, surge is detected from the sharpness of the drop in the flow signal. A limit boost pressure is then inferred as a function of the magnitude of the change over time of the flow signal and an actual speed of compressor 18. The limit boost pressure is then compared with the reference boost pressure. The lesser of the limit boost pressure and the reference boost pressure is now defined as a new setpoint boost pressure in order to lower the actual boost pressure below the critical limit pressure. The lowering may be achieved, for example, in the form of a reduction in the speed of compressor 18. Such a reduction in the speed of the compressor may, for example, be achieved by at least partially opening bypass valve 22, so that a portion of the exhaust gas stream flowing in exhaust gas line 16 bypasses exhaust gas turbine 20, causing it to rotate at a lower speed. Since compressor 18 is mechanically connected to exhaust gas turbine 20 via shaft 24, the compressor also rotates at a lower speed when exhaust gas turbine 20 rotates at a lower speed.

The regulation carried out makes it unnecessary to have precise knowledge of the exact value of the limit boost pressure ratio or limit boost pressure, since the method according to the present invention for regulating the boost pressure, based on the detection of surge, repeatedly attempts to take the boost pressure to the surge limit and on reaching the surge limit, reduces the setpoint boost pressure to beneath the surge limit, so that no compressor surge is present immediately thereafter. A zero crossing of the air mass flow rate sensor signal may be used as an additional variable for the detection of compressor surge.

Figure 3:
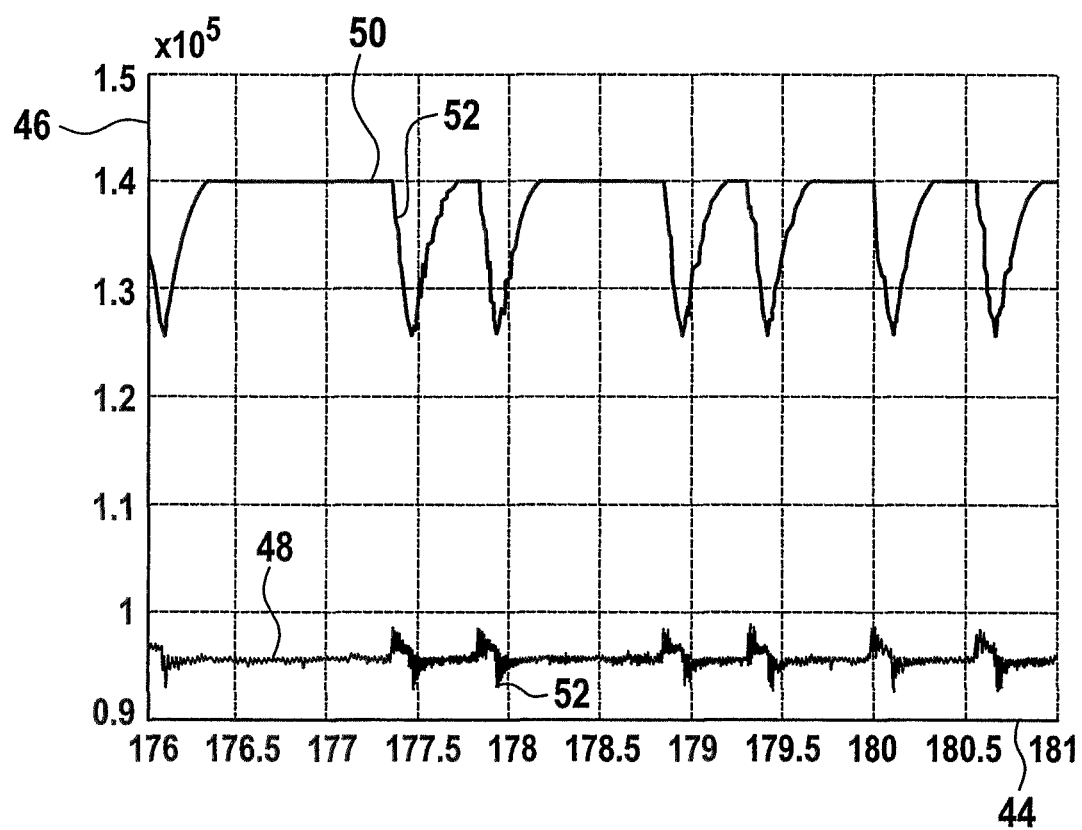
FIG. 3 shows a schematic representation of the pressure upstream and downstream from the compressor during compressor surge.

Alternatively or additionally, compressor surge may also occur based on pressure sensors 28, 30. An exemplary pressure curve is shown in FIG. 3. In FIG. 3, the time in seconds is plotted on X-axis 44, and the pressure in pascals is plotted on Y-axis 46. In this connection, curve 48 depicts the pressure detected by pressure sensor 28 upstream from compressor 18 and curve 50 depicts the pressure detected by pressure sensor 30 downstream from the compressor 18. In this connection, the method according to the present invention for regulating the boost pressure is able to ascertain a limit pressure ratio based on a magnitude of a change over time of the pressure signal. Surge due to exceeding a threshold value of a change over time in the form of an instantaneous signal change is also apparent in pressure curves 48, 50 represented in FIG. 3. In this case in particular, the gradient of the change in value is used as an indication of surge. An example of surge is apparent from the position marked as 52 in each case. It should be noted, however, that the signal of mass air flow rate sensor 26 is a better identifier of surge than the pressure signals due to its significantly greater dynamics.

The method according to the present invention for regulating a boost pressure thus makes it possible to operate the compressor close to the surge limit, since surge may be detected immediately after its occurrence and thus the boost pressure may be lowered by, for example, reducing the speed of the compressor. It is explicitly emphasized that the method according to the present invention for regulating a boost pressure is not limited to a fuel cell system. The method may also be used in internal combustion engines such as combustion engines, using an exhaust gas turbocharger.

What is claimed is:

1. A method for regulating a boost pressure of an engine which has a compressor, the method comprising:
    ascertaining a reference boost pressure based on a speed of the engine and a load of the engine;
    detecting at least one of a flow and a pressure of air supplied to the engine, and generating at least one of an associated flow signal and a pressure signal;
    using a smaller of the reference boost pressure and a limit boost pressure as a setpoint boost pressure; and
    regulating the setpoint boost pressure in such a way that a pressure ratio in the compressor does not exceed a limit boost pressure ratio;
    wherein the limit boost pressure ratio is ascertained based on a magnitude of a change over time of the at least one of the flow signal and the pressure signal, and
    wherein the limit boost pressure is ascertained based on the limit boost pressure ratio and a speed of the compressor.

2. The system as recited in claim 1, wherein the limit boost pressure ratio is ascertained based on the magnitude of the change over time of the flow signal.

3. The system as recited in claim 1, wherein the limit boost pressure ratio is ascertained based on the magnitude of the change over time of the pressure signal.

4. The method as recited in claim 1, wherein the limit boost pressure ratio is ascertained as exceeding a magnitude of the change over time of the at least one of the flow signal and the pressure signal.

5. The method as recited in claim 4, wherein the change over time of the flow signal is ascertained as a change of the flow signal per unit of time.

6. The method as recited in claim 4, wherein the pressure of the air supplied to the engine is detected at least one of upstream and downstream from the compressor.

7. The method as recited in claim 4, wherein the flow signal is corrected with respect to a reference pressure and a reference temperature.

8. The method as recited in claim 4, wherein the limit boost pressure ratio is additionally ascertained from a zero crossing of the flow signal.

9. The method as recited in claim 4, wherein the limit boost pressure is ascertained in such a way that the speed of the compressor is reduced corresponding to the change over time of the at least one of the flow signal and the pressure signal.

10. The method as recited in claim 9, wherein the speed of the compressor is reduced by opening a bypass valve of the compressor.

11. A pressure boost system for an engine, comprising:
    a compressor; and
    a regulation device for regulating a boost pressure of the engine, the regulation device including:
        an ascertaining arrangement configured to ascertain a reference boost pressure based on a speed of the engine and a load of the engine;
        a detecting arrangement configured to detect at least one of a flow and a pressure of air supplied to the engine, and generating at least one of an associated flow signal and a pressure signal;
        a selecting arrangement configured to select a smaller of the reference boost pressure and a limit boost pressure as a setpoint boost pressure; and
        a regulating arrangement configured to regulate the setpoint boost pressure in such a way that a pressure ratio in the compressor does not exceed a limit boost pressure ratio;
    wherein the limit boost pressure ratio is ascertained based on a magnitude of a change over time of the at least one of the flow signal and the pressure signal, and
    wherein the limit boost pressure is ascertained based on the limit boost pressure ratio and a speed of the compressor.

12. The system as recited in claim 11, wherein the engine includes at least one fuel cell.

* * * * *